United States Patent
Soffer et al.

(10) Patent No.: US 8,769,172 B2
(45) Date of Patent: Jul. 1, 2014

(54) SECURE KVM DEVICE ENSURING ISOLATION OF HOST COMPUTERS

(75) Inventors: Aviv Soffer, Caesarea (IL); Oleg Vaisband, Kiryat Yam (IL)

(73) Assignee: High Sec Labs Ltd., Yokneam (IL)

( * ) Notice: Subject to any disclaimer, the term of this patent is extended or adjusted under 35 U.S.C. 154(b) by 0 days.

(21) Appl. No.: 13/060,231

(22) PCT Filed: Aug. 19, 2009

(86) PCT No.: PCT/IL2009/000815
§ 371 (c)(1),
(2), (4) Date: Feb. 22, 2011

(87) PCT Pub. No.: WO2010/020991
PCT Pub. Date: Feb. 25, 2010

(65) Prior Publication Data
US 2011/0145451 A1    Jun. 16, 2011

Related U.S. Application Data

(60) Provisional application No. 61/089,945, filed on Aug. 19, 2008.

(51) Int. Cl.
*G06F 13/12*    (2006.01)
*G06F 21/83*    (2013.01)
*G06F 21/82*    (2013.01)
*G06F 13/00*    (2006.01)

(52) U.S. Cl.
CPC ............... *G06F 21/83* (2013.01); *G06F 21/82* (2013.01); *G06F 13/00* (2013.01); *G09G 2370/24* (2013.01)
USPC .............................................. 710/64; 710/62

(58) Field of Classification Search
None
See application file for complete search history.

(56) References Cited

U.S. PATENT DOCUMENTS

| | | | |
|---|---|---|---|
| 6,671,756 B1 * | 12/2003 | Thomas et al. | 710/73 |
| 7,028,110 B2 * | 4/2006 | Seki et al. | 710/36 |
| 7,113,978 B2 | 9/2006 | Beasley et al. | |
| 7,240,111 B2 | 7/2007 | VanHarlingen et al. | |
| 7,284,278 B2 | 10/2007 | Anson et al. | |
| 7,568,029 B2 | 7/2009 | VanHarlingen et al. | |
| 7,675,867 B1 * | 3/2010 | Mraz et al. | 370/254 |

(Continued)

FOREIGN PATENT DOCUMENTS

WO    03/009118 A2    1/2003

OTHER PUBLICATIONS

"Peripheral Sharing Switch (PSS) for Human Interface Devices" Protection Profile; Sep. 7, 2010, NSA (NIAP) in www.niap-ccevs.org/pp/PP_PSSHID_V2.1.

(Continued)

*Primary Examiner* — Idriss N Alrobaye
*Assistant Examiner* — Richard B Franklin
(74) *Attorney, Agent, or Firm* — Browdy and Neimark, PLLC

(57) ABSTRACT

The present invention presents apparatuses and systems for operating multiple computers from a single console using a secured KVM device, while preventing information leakage between the computers. The system comprises several hosts connected through a secured KVM device to keyboard and mouse and one or more user displays. Secured KVM enables standard bi-directional communication between Secured KVM and user keyboard and mouse and between hosts peripheral ports and Secured KVM. Secured KVM physically enforces unidirectional data flow from attached keyboard and mouse to attached hosts peripheral ports to avoid potential leakages between hosts.

21 Claims, 16 Drawing Sheets

(56) References Cited

U.S. PATENT DOCUMENTS

| | | |
|---|---|---|
| 2002/0166067 A1 | 11/2002 | Pritchard et al. |
| 2004/0177264 A1 | 9/2004 | Anson et al. |
| 2004/0201765 A1 | 10/2004 | Gammenthaler |
| 2005/0015980 A1 | 1/2005 | Kottilingam et al. |
| 2005/0044266 A1 | 2/2005 | O'Neil |
| 2006/0230110 A1 | 10/2006 | VanHarlingen et al. |
| 2007/0033289 A1 | 2/2007 | Nuyttens et al. |
| 2007/0245165 A1 | 10/2007 | Fung |
| 2007/0260785 A1 | 11/2007 | Chen |
| 2008/0015087 A1 | 1/2008 | Negrin |
| 2008/0048975 A1 | 2/2008 | Leibow |
| 2008/0062121 A1* | 3/2008 | Huang et al. ............... 345/156 |
| 2008/0062632 A1 | 3/2008 | Liu |
| 2008/0081515 A1 | 4/2008 | Wu |
| 2008/0163000 A1 | 7/2008 | McKim et al. |
| 2010/0295859 A1* | 11/2010 | Stauffer et al. ............... 345/531 |

OTHER PUBLICATIONS

U.S. Government Approved Protection Profile—Validated Protection Profile—Peripheral Sharing Switch for Human Interface Devices Protection Profile, Version 2.1, NSA (NIAP) in www.niap-ccevs.org/pp/PP_PSSHID_V2.1.

CCEVS Approved Assurance Continuity Maintenance Report, Peripheral Sharing Switch (PSS) for Human Interface Devices.

* cited by examiner

SECURE KVM DEVICE ENSURING ISOLATION OF HOST COMPUTERS

RELATED APPLICATIONS

The present patent application claims priority to the Provisional Application No. 61/089,945 of Aug. 19, 2008, as well as of the international application No. PCT/IL2009/00815 of Aug. 19, 2009. The entire content of these applications is incorporated herein by explicit reference for all purposes.

FIELD OF THE INVENTION

The present invention, in some embodiments thereof, relates to apparatuses and systems for operating multiple computers from a single set of peripheral devices. More particularly, the invention presents a special secure KVM device for interacting with computers using a single console, while preventing data leakage between the connected computers and attached networks.

BACKGROUND OF THE INVENTION

Existing devices such as a Keyboard Video Moose (KVM) switch are used for interconnecting a single computer to multiple computers for control purposes. The switch enables sending commands and getting information from the controlled computers, thus a user of a KVM may have remote access to multiple computers from a single keyboard, a monitor, and a mouse. During access, keyboard characters or pointing data are sent to the remote computers and video signals are routed via the switch from the remote computers, processed, and displayed on the single video monitor. In general, the user navigates through an on-screen menu or display for easy of switching between the controlled computers.

Some KVM switches allow a user to view and access one of the controlled computers, while at the same time, the user can view video images from the others non-accessed computers on some parts of his video screen. This provides simultaneous information to the user and enables fast and simple on-screen navigation between the controlled computers.

Prior art for available products that allow a user to view video images from multiple sources simultaneously on a single screen, include the QuadView™ XL, and the device described in "Apparatus and system for managing multiple computers", to VanHarlingen, Brian, Leibow, Michael, Chen and Li-ter, U.S. publication Ser. No. 11/105,063 U.S., now U.S. Pat. No. 7,240,111; but these products do not protect the information passed through the combiner device and leakage between the controlled computers is made possible on the KVM switch even if the controlled computers are far apart.

Previous systems presenting a KVN include United States Patent Application Number 2006/0230110A1, titled "Apparatus and system for managing multiple computers" to Brian VanHarlingen, Michael Leibow, and Li-ter Chen. However, they describe a non-secured KVM wherein the managed computers are not isolated and no isolation means presented.

Other Referenced Patents and Applications

1. United States Patent Application 20050044266—High isolation KVM switch
2. United States Patent Application 20040015980—Systems and methods for monitoring and controlling multiple computers
3. U.S. Pat. No. 7,240,111—Apparatus and system for managing multiple computers
4. U.S. Pat. No. 7,284,278—Secured KVM switch
5. U.S. Pat. No. 7,568,029—Apparatus and system for managing multiple computers
6. U.S. Pat. No. 7,113,978—Computer interconnection system For many applications (such as transactions in banking markets) it is desirable to have a secured management device that, on one hand allows for simple interaction and control of multiple computers, yet, on the other hand, prevents information leakage between the controlled computers.

The present invention addresses this aspect of isolation in a combiner, thus providing higher level of security.

SUMMARY OF THE INVENTION

The present invention, in some embodiments thereof, relates to apparatuses and systems for managing multiple computers from a single location. More particularly, the invention presents a special secure KVM switch for managing computers from a single console, while preventing information leakage between the controlled computers.

According to an exemplary embodiment of the current invention, an Isolated multi-network computer system is provided, the system comprising:

Two or more Host Computers having video output port and peripheral port wherein each host computer connected to a different network having different or same security level; one or more User Display devices having video input port; a User Pointing device having peripheral port; a User Keyboard device having peripheral port; a Secured KVM device connected between Host Computer video output ports and User display device input port and between the User Pointing device peripheral port and Host Computers peripheral ports and between User Keyboard device peripheral port and Host Computers peripheral ports, wherein Secured KVM device enables standard bi-directional communications between Host Computer peripheral port and Secured KVM, between Secured KVM and User Pointing device, and between Secured KVM and User Keyboard device, and wherein Secured KVM device physically forces unidirectional data flow from User Pointing device and User Keyboard device to Host Computers peripheral ports and physically isolates Host Computers peripheral ports to prevent data leakage between Host Computers.

In some embodiments, in the Secured KVM device, each Host Computer peripheral port is connected to a separate circuitry emulating peripheral device to the Host Computer and connected to the physical unidirectional forcing circuitry.

In some embodiments, in the Secured KVM device, said physical unidirectional forcing circuitry is based on a unidirectional serial link.

In some embodiments, in the Secured KVM device, said physical unidirectional forcing circuitry is based on unidirectional optical isolator link.

In some embodiments, in the Secured KVM device, the physical unidirectional forcing circuitry is based on unidirectional electromagnetic isolator link.

In some embodiments, in the Secured KVM device, each said emulation circuitry is electrically isolated from the others and having different isolated ground planes.

In some embodiments, in the Secured KVM device, each said emulation circuitry is electromagnetically isolated from the others and from other Secured KVM circuitry.

In some embodiments, in the Secured KVM device, each said emulation circuitry is powered by an isolated power source internally generated or supplied by each connected Host Computer.

In some embodiments, in the Secured KVM device, said physical unidirectional forcing circuitry of each Host Computer are connected to a switching circuitry to automatically or manually select active host to be operated by User Pointing device and User Keyboard device and wherein said switching circuitry is connected to a Peripheral Host Controller that is also connected to the user pointing device and user keyboard.

In some embodiments, in the Secured KVM device, said physical unidirectional forcing circuitry of each Host Computer are connected directly to a Peripheral Host Controller also connected to the user pointing device and user keyboard.

In some embodiments, in the Secured KVM device, the Peripheral Host Controller is a PS/2 keyboard controller connected to the User Keyboard device using PS/2 protocol and connected to the said switching circuitry or said physical unidirectional forcing circuitry using unidirectional standard or proprietary protocol.

In some embodiments, in the Secured KVM device, the Peripheral Host Controller is a PS/2 mouse controller connected to the User Pointing device using PS/2 protocol and connected to said switching circuitry using unidirectional standard or proprietary protocol.

In some embodiments, in the Secured KVM device, the Peripheral Host Controller is a USB controller connected to a USB User Keyboard device and USB User Pointing device using USB protocol and connected to the said switching circuitry or said physical unidirectional forcing circuitry using unidirectional standard proprietary protocol.

In some embodiments, in the Isolated multi-network computer system, said Host Computer video output ports are electrically, optically or wirelessly coupled to respective video input ports of said Secured KVM device.

In some embodiments, in the Secured KVM device, said video input ports are connected to video switching circuitry and to one or more video display output ports connected to one or more User Displays.

In some embodiments, in the Secured KVM device, said video input ports are analogically connected to analog video switching circuitry and to one or more analog video display output ports connected to one or more User Displays.

In some embodiments, in the Secured KVM device, the video input ports are digitally connected to a digital video receiver connected to a digital video multiplexer or processor circuitry and to one or more digital video display output ports connected to one or more User Displays.

In some embodiments, in the Secured KVM device, the video input ports are based on protocol selectable from: Digital Visual Interface (DVI) protocol, Display Port or High-Definition Multimedia Interface (HDMI) connected to a matching video receiver connected to a digital video multiplexer or processor circuitry and to one or more digital video display output ports connected to the User Display device.

In some embodiments, in the Secured KVM device, the video input ports are analog connected to a video Analog to Digital Converter (ADC) connected to digital multiplexer or processor circuitry and to one or more digital video display output port connected to the User Display device.

In some embodiments, in the Secured KVM device, the digital multiplexer/processor circuitry is capable of switching between host input video ports supplying to User Display device only one host video image based on user selection.

In some embodiments, in the Secured KVM device, the digital multiplexer/processor circuitry is further capable of simultaneously displaying more than one host input video windows on the User Display device.

In some embodiments, in the Secured KVM device, the digital multiplexer/processor circuitry is further capable of generating colored frames around host video windows to help users identifying window source.

In some embodiments, in the Secured KVM device, the digital multiplexer/processor circuitry is further comprising of a video frame buffer memory to enable simultaneous display of asynchronous video sources from Host Computers having different video resolution setting, different refresh rates and different video signal phases.

In some embodiments, in the Secured KVM device, the digital multiplexer/processor circuitry uses one of the host input video signals to synchronize video output signal.

In some embodiments, in the Secured KVM device the digital multiplexer/processor circuitry independently generating and sync required video output signals.

In some embodiments, in the Secured KVM device, the digital multiplexer/processor circuitry is substantially based on a Field Programmable Gate Array (FPGA).

In some embodiments, in the Secured KVM device, the digital multiplexer/processor circuitry is substantially based on Application Specific Integrated Circuit (ASIC).

In some embodiments, in the Secured KVM device, the digital multiplexer/processor circuitry is substantially based on programmable CPU.

In some embodiments, in the Secured KVM device, the digital multiplexer/processor circuitry and host controller are further connected to a cascading port to synchronize video display and peripherals activity between cascaded Secured KVM devices.

In some embodiments, in the Secured KVM device, the digital multiplexer/processor circuitry receives graphic commands from said peripheral host controller.

In some embodiments, in the Secured KVM device, the digital multiplexer/processor circuitry is having a non-volatile memory device to store multiplexer/processor programs, administrator and user settings and optional customized display background bitmaps.

In some embodiments, in the Secured KVM device, the user can select active Host Computer based on switch position.

In some embodiments, in the Secured KVM device, the user can select active Host Computer based on programmable User Keyboard key combination.

In some embodiments, in the Secured KVM device, the user can select active Host Computer based on programmable User mouse key triggering.

In some embodiments, in the Secured KVM device, the user can toggle between active Host Computers using User Pointing device wheel rotation.

In some embodiments, in the Secured KVM device, the active Host Computer is automatically selected based on system cursor location.

In some embodiments, in the Isolated multi-network computer system, the Host Computers further having an Audio output port connected to said Secured KVM device Audio Input port.

In some embodiments, in the Secured KVM device, the Audio Input ports are connected to an audio mixer or switch connected to an Audio output port. Audio output port may be connected to User Headphones or speakers.

In some embodiments, in the Secured KVM device, the audio mixer or switch is further connected to external cascading port to enable audio output device sharing between cascaded Secured KVMs.

In some embodiments, in the Secured KVM device, the Audio Input ports are electrically isolated to prevent electrical leakage between Host Computers.

In some embodiments, in the Isolated multi-network computer system, the Host Computers further having a Microphone input port connected to said Secured KVM device Microphone Output port.

In some embodiments, in the Secured KVM device, the Microphone Output ports are connected to an audio mixer or switch connected to a Microphone Input port. Microphone input port may be connected to User Headphones or microphone.

In some embodiments, in the Secured KVM device, the audio mixer or switch is further connected to external cascading port to enable audio input device sharing between cascaded Secured KVMs.

In some embodiments, in the Secured KVM device, the Microphone Output ports are electrically isolated to prevent electrical leakage between Host Computers.

In some embodiments, in the Secured KVM device, the Microphone and Audio output audio levels depending on active Host selected.

In some embodiments, in the Secured KVM device, the plurality of local device settings such as Host Computers display resolution, output display resolution, frame colours, frame thickness, cursor type, task-bar size and background bitmap can be accessed and modified by authorized user through a secured administrator mode.

In some embodiments, in the Secured KVM device, the plurality of local device settings such as Host Computers windows location and size can be modified and stored by authorized user through on-screen menus.

In some embodiments, in the Secured KVM device, the administrator mode can be accessed using programmable user name and password.

In some embodiments, in the Secured KVM device, the administrator mode can be accessed using electromechanical key switch.

In some embodiments, in the Secured KVM device, the administrator mode can be accessed using programmable portable storage device or card.

In some embodiments, in the Secured KVM device, the administrator mode can be accessed using console management port and remote computer.

In some embodiments, in the Secured KVM device, the local device settings can be further accessed and modified by authorized user using standard remote management protocol such as SNMP.

In some embodiments, in the Secured KVM device, the local device settings can be further loaded from or saved on a portable storage device such as flash disk or memory card.

In some embodiments, in the Secured KVM device, the device is further comprising of circuitry to signal Host Computer video controller Plug & Play Display Data Channel (DDC) compatibility information such as display resolution, display type and display refresh rate.

In some embodiments, in the Secured KVM device, the circuitry is device is further comprising of non-volatile memory such as ROM, programmable microcontroller or EEPROM containing standard display data to emulate a standard display.

In some embodiments, in the Secured KVM device, the device is further comprising of circuitry to automatically detect connected User Display parameters and configure device display output parameters accordingly.

In some embodiments, in the Secured KVM device, the device is further comprising of a cascading port to enable connection and synchronization of more than one Secured KVM devices and thus increasing the number of connected Host Computers.

In some embodiments, in the Isolated multi-network computer system, the one or more Host Computer can be substituted by a thin-client device.

In some embodiments, in the Isolated multi-network computer system, the one or more Host Computer can be substituted by an external video source interface to enable display of video source.

In some embodiments, in the Secured KVM device, the device is further comprising of one or more thin-client devices reducing the number of needed external Host Computers.

In some embodiments, in the Secured KVM device, the device is further comprising of one or more anti-tampering means such as PCB over-molding, micro-switch, light sensor, anti-tampering label, tampering memory, thermal sensor and case resistance sensor.

In some embodiments, in the Secured KVM device, the digital multiplexer/processor circuitry is further capable of reducing incoming video bandwidth by means selectable from the list of: colour-depth reduction, resolution reduction, refresh rate reduction, cropping, colour space conversion, and dropped frames.

In some embodiments, in the Secured KVM device, the digital multiplexer/processor circuitry is further capable of generating a task-bar to help user navigating between windows.

In some embodiments, in the Secured KVM device, the digital multiplexer/processor circuitry is further capable of minimizing Host Computer window into the task-bar and maximizing it to original size again.

In some embodiments, in the Secured KVM device, the user can use the task-bar to disable unused channels.

In some embodiments, in the Secured KVM device , the digital multiplexer/processor circuitry is further capable of enabling the user to scale a Host Computer window up and down and view window parts by using scroll-bars.

In some embodiments, in the Secured KVM device, the device is further comprising of a chassis with identical bays for each channels wherein bays enables field installation of plurality of compatible modules.

In some embodiments, in the Secured KVM device, the device is further comprising of a thin-client/computer module having matching connector to enable insertion into In some embodiments, in the chassis bays.

In some embodiments, in the Secured KVM device, the device is further comprising of an auxiliary host interface module having matching connector to enable insertion into the chassis bays and cable interfaces with connected host computer.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE DRAWINGS

Figure 1:
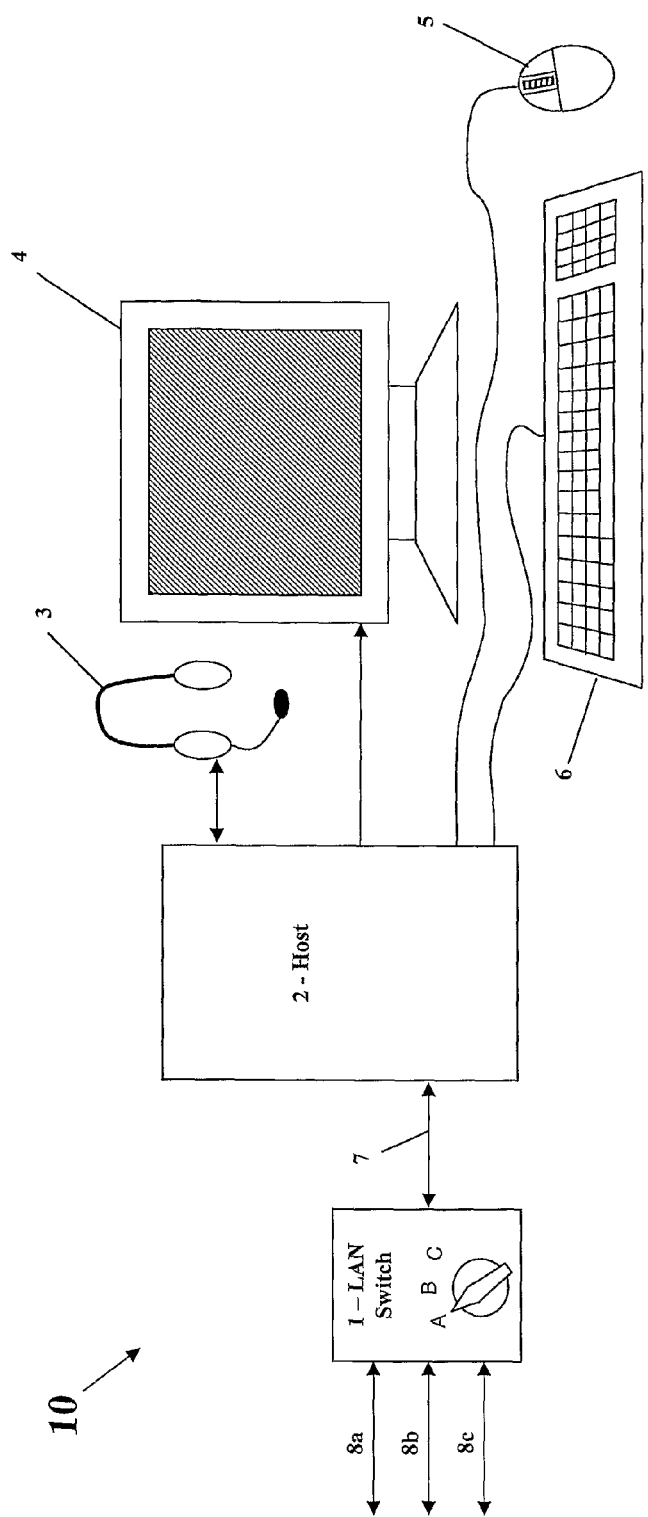
FIG. 1 illustrates a high-level block-diagram of a prior art system that enables a computer user to access multiple isolated networks using a single host computer.

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

FIG. 1 illustrates a high-level block-diagram of a prior art system 10 that enables a computer user to access multiple isolated networks using a single host computer. Host Computer 2 may be a PC, workstation, thin-client or portable computer connected to a single set of user mouse 5, user keyboard 6, user display 4 and user headset 3. Host Computer 2 connected to three separate networks 8a, 8b and 8c via LAN (Local Area Network) cable 7 and LAN switch 1. LAN switch 1 may be a simple mechanical switch controlled by the user to enable access to the three LAN ports 8a, 8b, and 8c. As the three networks may have different security levels it is typically desirable that LAN switch 1 will be designed in such way that it will reduce the risk electrical leakage between the three connected networks. One major drawback of this method is that the connected of different security level networks to a single host 2 and its network adapter presenting the risk of leakage between the networks in the host. This can be done by hardware or by software means and although both networks are not connected simultaneously to the host 2, information leaks may happen after LAN switch 1 connecting the host 2 to a different network. Another drawback of this system is the need to reboot the host 2 after switching network. Even with this practice data may leak between networks through the single attached host 2.

Another disadvantage of this prior-art system is that the user cannot work simultaneously at application from different networks. This switching between application and networks is though for users that needs to work on different networks on a daily basis.

Figure 2:
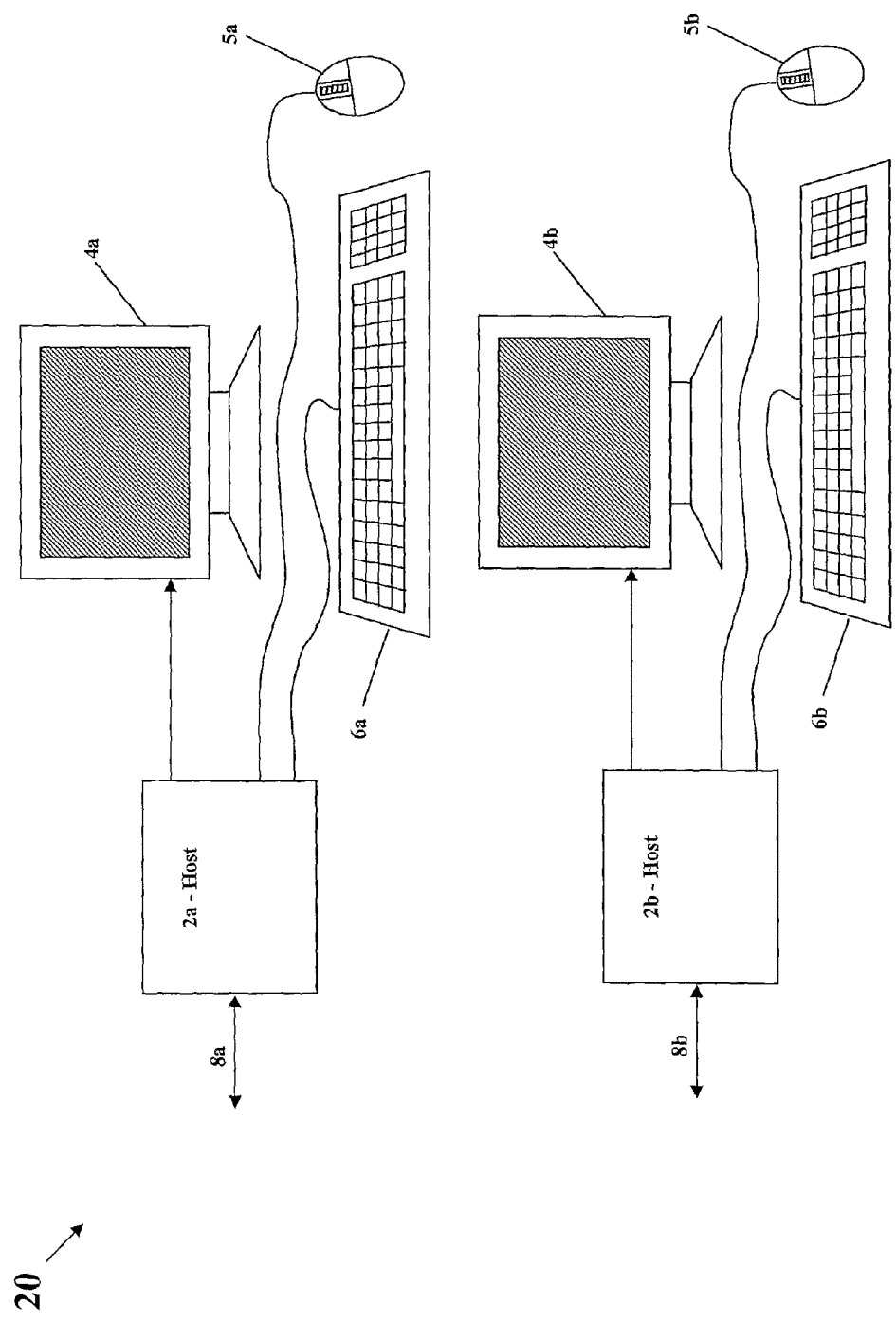
FIG. 2 illustrates a high-level block-diagram of yet another prior art system that enables a computer user to access multiple networks using multiple host computers.

FIG. 2 illustrates a high-level block-diagram of yet another prior art system 20 that enables a computer user to access multiple networks using multiple host computers. In this system the user uses two sets of computer hosts 2a and 2b, connected to two separate networks 8a and 8b accordingly. Computer hosts 2a and 2b also connected to two sets of desktop interaction devices—user keyboards 6a and 6b, user mice 5a and 5b and two user displays 4a and 4b.

While this system eliminates the risk of leakage between the two networks 8a and 8b, it has several disadvantages. One disadvantage of this system is that the user needs to interact with two separate sets of keyboards mice and displays. This divided focus tends to confuse the user. Another disadvantage is the desktop space needed and the added costs of the two separate sets.

Figure 3:
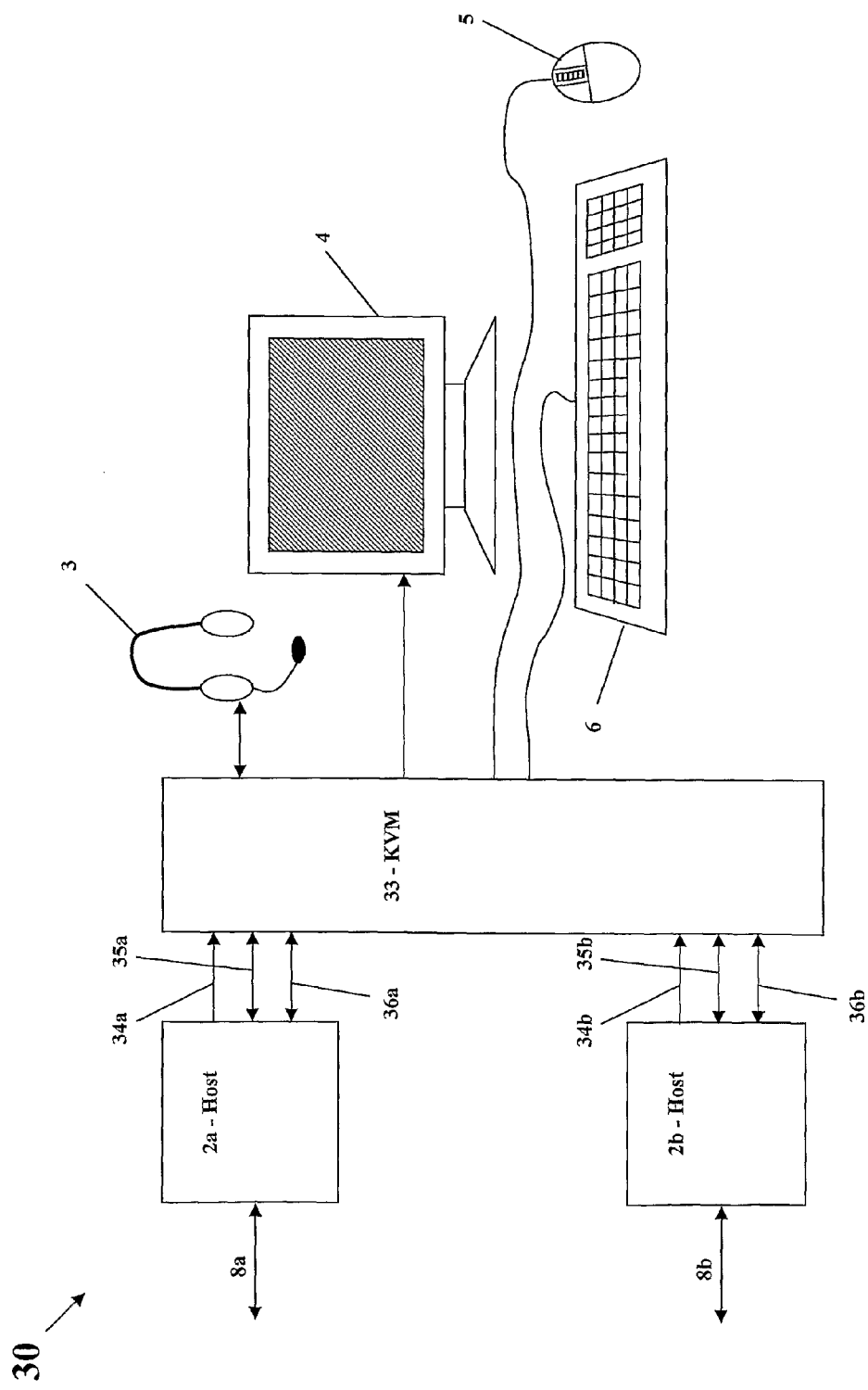
FIG. 3 illustrates a high-level block-diagram of yet another prior art system that enables a computer user to access multiple networks using multiple host computers and legacy KVM (Keyboard Video Mouse) device.

FIG. 3 illustrates a high-level block-diagram of another prior art system 30 that enables a computer user to access multiple networks using multiple host computers and legacy KVM (Keyboard Video Mouse) device. In this system Host Computers 2a and 2b may be PC, workstation, thin-client or portable computer. Host computers 2a and 2b are connected to isolated networks 8a and 8b respectively.

Host computers 2a and 2b are connected to a KVM device 33 through a set of connection cables. Cables 34a and 34b delivers the video output of Host computers to the KVM. Cables 35a and 35b connects the peripheral interface of Host computers to the KVM. Peripheral interface may be PS/2 (IBM Personal System 2 standard), USB (Universal Serial Bus) or other peripheral protocol. Cables 36a and 36b connects the audio input/output of Host computers to the KVM. KVM device 33 switches the Host computer inputs/outputs to the connected set of Human Interface devices comprising of a display 4, mouse 5, keyboard 6 and headset or speakers 3. Switch over from Host computer 2a to 2b and back is controlled by the user through special keyboard keys combination or by activation a switch located at the KVM 33.

While this system has the advantage of reduced LAN leakage through the Host computers, it can still enable data leakage at the KVM 33 due to software or hardware vulnerabilities.

Another disadvantage of this system is that the user must switch completely from one environment to the other. Some legacy KVMs designed to provide electrical isolation between the host computers to reduce the risk of electrical and electromagnetic leakages between the isolated LANs.

Figure 4:
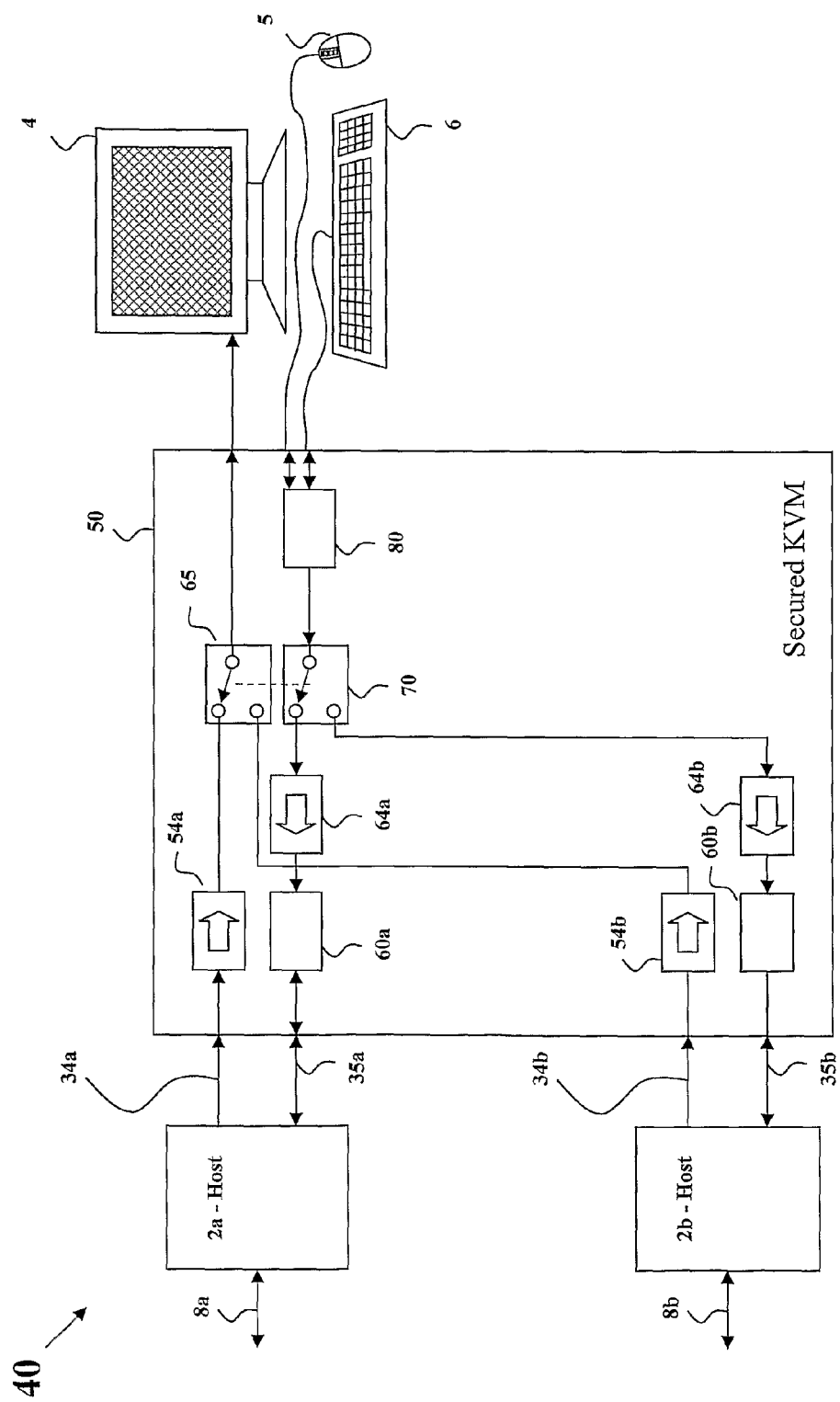
FIG. 4 illustrates a high-level block-diagram of a preferred embodiment of the present invention that enables a computer user to safely access multiple isolated networks using multiple host computers and a secured KVM device.

FIG. 4 illustrates a high-level block-diagram of a preferred embodiment of the present invention 40 that enables a computer user to safely access multiple isolated networks using multiple host computers and a Secured KVM device. In this system Host Computers 2a and 2b may be PC, workstation, thin-client or portable computer. Host computers 2a and 2b are connected to isolated networks 8a and 8b respectively. It should be noted here that Secured KVM device may have many more ports to support additional Host Computers. To simplify the figures, only two channels are shown hereafter.

Host computers 2a and 2b are connected to a Secured KVM device 50 through a set of connection cables. Cables may be substituted by other connection means such as fiber-optical links or wireless connection. Cables 34a and 34b delivers the video output of Host computers to the Secured KVM device 50. Cables 35a and 35b connects the peripheral interface of Host Computers 2a and 2b to the Secured KVM 50. Peripheral interface may be PS/2 (IBM Personal System 2 standard), USB (Universal Serial Bus) or any other suitable peripheral protocol.

Secured KVM device 50 Host Computer 2a video inputs connected to an optional physical isolator 54a. Physical isolator may be opto-isolator, serial link, electromagnetic coupler, transformer or any other suitable circuitry. Similarly Host Computer 2b video input is connected to an optional physical isolator 54b. Isolation may be needed to avoid signal leakage between host computers due to common ground or power. If Host video input is analog additional buffer amplifier circuitry may be needed to properly interface with analog video source. If Host video input is digital (such as DVI) additional receiver circuitry may be needed to properly interface with digital video source.

Physical isolators 54a and 54b are connected to the video switch 65 to select active channel visible to the user through video output and User Display device 4.

Physical isolators 54a and 54b may have built-in or separate Analog to Digital converter (ADC) to enable interfacing with analog video signals from Host Computers 2a and 2b.

Secured KVM device 50 Host Computer 2a peripheral port 35a is connected to peripheral emulator circuitry 60a. Secured KVM device 50 Host Computer 2b peripheral port 35b is connected to peripheral emulator circuitry 60b. Peripheral Emulators circuitry 60a and 60b emulating standard peripheral device such as USB or PS/2 keyboard or mouse. Peripheral Emulators circuitry 60a and 60b are connected to physical unidirectional enforcing circuitry 64a and 64b respectively. Physical unidirectional enforcing circuitry 64a and 64b are for example: opto-isolator, serial link, electromagnetic coupler, transformer or any other suitable circuitry assuring one directional flow of data. Physical unidirectional enforcing circuitry 64a and 64b are required in order to assure that in any case of software failure or intended sabotage in the Host Computers 2a and 2b or in the Secured KVM device 50, peripheral interface cannot cause information leakage between host computers.

Physical unidirectional enforcing circuitry 64a and 64b are connected to peripheral switch 70 to select active peripheral channel connected to the user keyboard and mouse.

Host controller 80 connected to the peripheral switch 70 interfaces between the bidirectional data flow of the connected user peripherals (mouse 5 and keyboard 6) and the physically forced unidirectional data flow to the said peripheral emulators 60a and 60b.

Since peripheral protocols are bi-directional in nature and the data path between the host controller 80 and the peripheral emulators 60a and 60b is forced to unidirectional flow, the host controller serves as an interface between the standard peripheral protocol (such as PS/2 or USB) and the non-standard unidirectional internal protocol. This internal protocol may use one way serial, I2C or any other standard or non standard interface.

Video switch 65 and peripheral switch 70 can be manually operated by the user by means of mechanical switch. Video switch 65 and peripheral switch 70 can be alternatively controlled by host controller function 80 to switch sources based on preprogrammed keyboard keys combination or mouse control.

Figure 5:
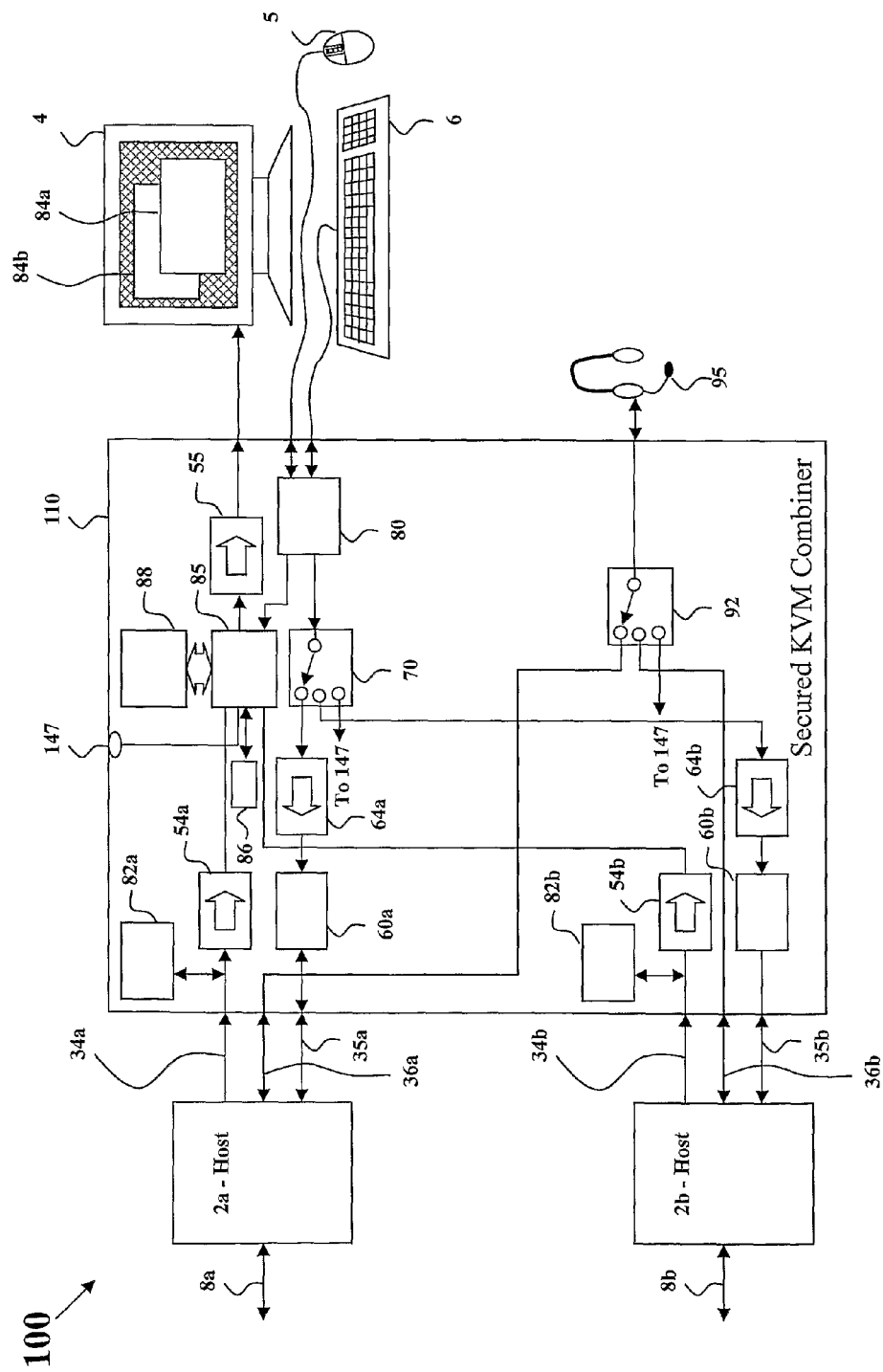
FIG. 5 illustrates a high-level block-diagram of another preferred embodiment of the present invention having secured KVM combiner function.

FIG. 5 illustrates a high-level block-diagram of a preferred embodiment of the present invention 100 similar to the previous FIG. 4 having Secured KVM Combiner function 110. In this preferred embodiment of the present invention the video switch function 65 of the previous FIG. 4 replaced by video processing function 85. This video processing function receives multiple digital video data from optional physical isolators 54a and 54b to generate windows 84a and 84b (respectively) on output video port. To enable asynchronous video input and to enable additional video function an optional volatile memory 88 serving as video frame buffer connected to the video processing function 85. Volatile memory 88 may be DRAM, DDR or any suitable fast volatile memory type.

Video processing function 85 may optionally be comprised of discrete logic, CPU, FPGA or ASIC technology.

Video processing function 85 receives commands from host controller function 80 based on user mouse and keyboard input. The host controller function 80 calculates mouse location in system mode, keys status, windows sizes, priority and locations and all other machine states and send proper commands to the video processing function 85 directly or through optional unidirectional flow device. User specific settings and administrator settings are all stored in the host controller function 80 non-volatile memory.

Video processing function 85 can receive video data from hosts that are not at the same display setting (resolution, refresh rate, colors, and phase) and stores it temporarily on the volatile memory frame-buffer 88. Video output is generated by reading the volatile memory frame-buffer 88 content at any needed rate. Output display resolution can be adapted to any desirable setting irrespective to video input settings. Video processor may have a non-volatile memory device 86 to store CPU, FPGA or ASIC program and optional customer specific graphics such as display background images. Video processing function 85 typically connected to the user display 4 through DVI or HDMI transmitter 55 acting as a unidirectional flow device. This DVI or HDMI transmitter converts the digital video stream to differential signals needed to drive standard displays.

Non-volatile memory 82a and 82b connected to the Host Computers 2a and 2b respectively. Non-volatile memory may contain display parameters readable to the host to emulate standard display DDC (Display Data Channel). Upon connection of Secured KVM Combiner to the Host Computers 2a and 2b, Host computers video circuitry interrogates the non-volatile memory functions 82a and 82b to receive Plug & Play parameters such as display name, supported display resolution, supported display refresh rate etc. Non-volatile memory functions 82a and 82b may be programmed by the user to provide adequate information to the Host Computers as needed.

As video input data may have higher combined bandwidth than memory and video processing bandwidth various methods may be used to reduce such bandwidth.

Cropping of input video data removes data of areas that are not visible on the user display at any particular moment Frame dropping—reduces incoming video data by skipping some frame. This method may cause visible artifacts though.

Reduced color depth or color depth conversion reduces input data at the cost of reduced color representation.

Other methods may be used to avoid bandwidth limitations depending on required video input settings.

An optional audio switching or mixing may be added to the Secured KVM Combiner device 110 in order to enable user to operate audio peripherals such as microphone, headset 95 or speakers. Host Computers 2a and 2b having additional audio cables 36a and 36b connected to the Secured KVM Combiner apparatus. Cables may be audio out, audio in, microphone or any other digital or analog audio signal. Audio multiplexer/mixer 92 enables volume control of selected/unselected hosts based on programmed settings. For example selected host audio channel may have higher volume compared to other host audio signals. In some exemplary embodiments, audio signals comprises of speaker signals transmitted to the user speaker, but no microphone signals. By allowing only speaker signals, unidirectional signal flow is ensured.

Cascading port 147 connected to the video processor 85 and optionally connected to host controller 80, enable parallel connection of more than one Secured KVM Combiner devices to increase the number of Host Computer ports. To support cascading of peripherals and audio, switches 70 and 92 may have an additional (third in the depicted exemplary embodiment) position to enable access of external cascaded Secured KVM Combiner to the attached set of headset 95, keyboard 6 and mouse 5. In order to coordinate cursor location and system states, host emulator function 80 may be also connected to the cascading port 147.

Figure 6A:
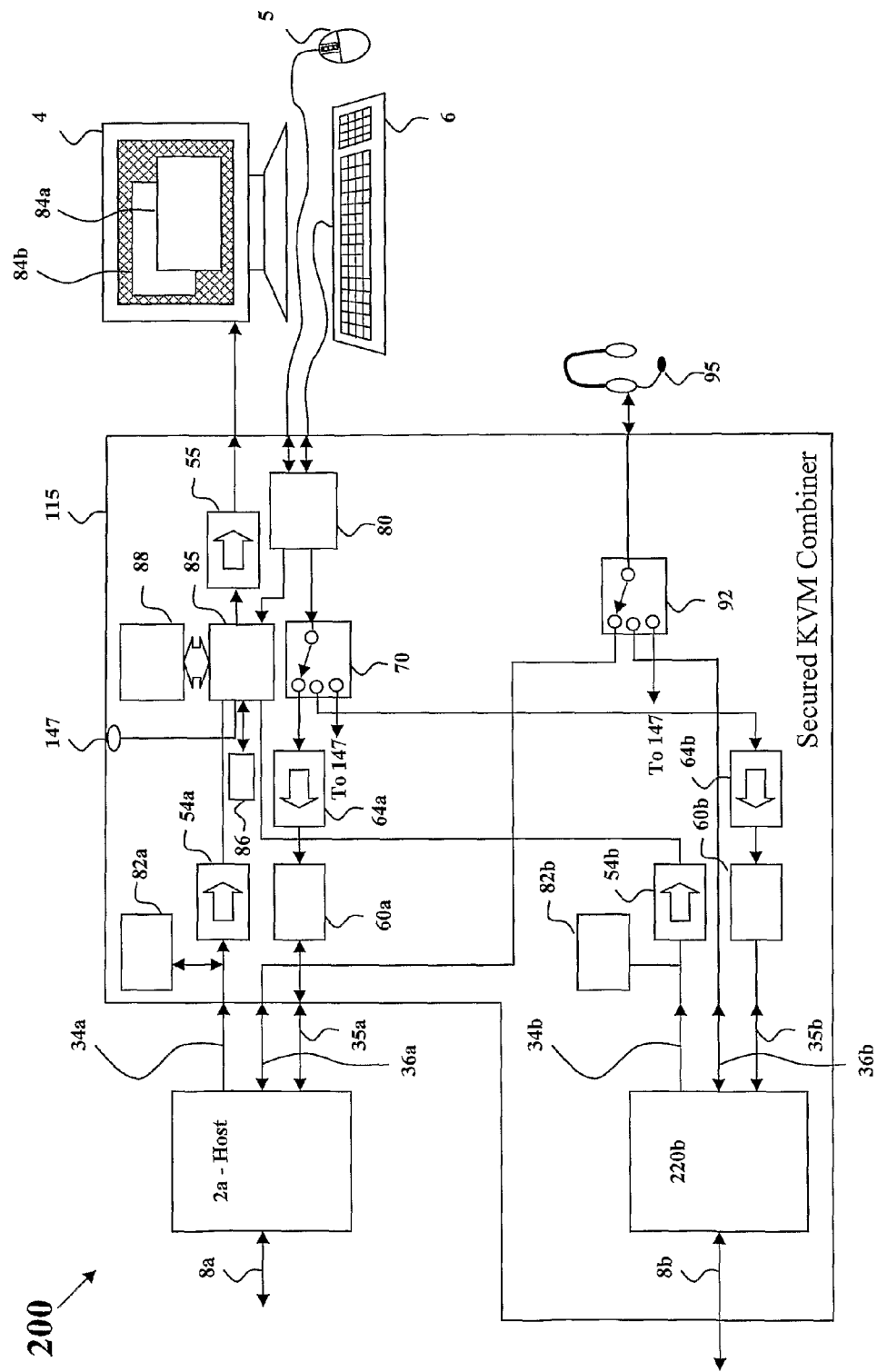
FIG. 6a illustrates a typical implementation of a secured KVM combiner of another preferred embodiment of the present invention.

FIG. 6a illustrates a typical implementation of a Secured KVM Combiner 115 similar to the Secured KVM Combiner 110 of the previous FIG. 5. In this system 200, second host 2b is replaced by an internal thin-client/computer module 220b. This thin-client module internally connected to other Secured KVM Combiner functions through peripheral interface 35b, video interface 34b and audio interface 36b. Thin-client/computer module connected to its local area network 8b through a LAN jack or fiber interface installed on the device panel. Other controls and indications may be installed to support the thin-client/computer module 220b, such as Power/Fail LED, Reset switch and direct USB port to support local peripherals such as printers and authentication devices.

Figure 6B:
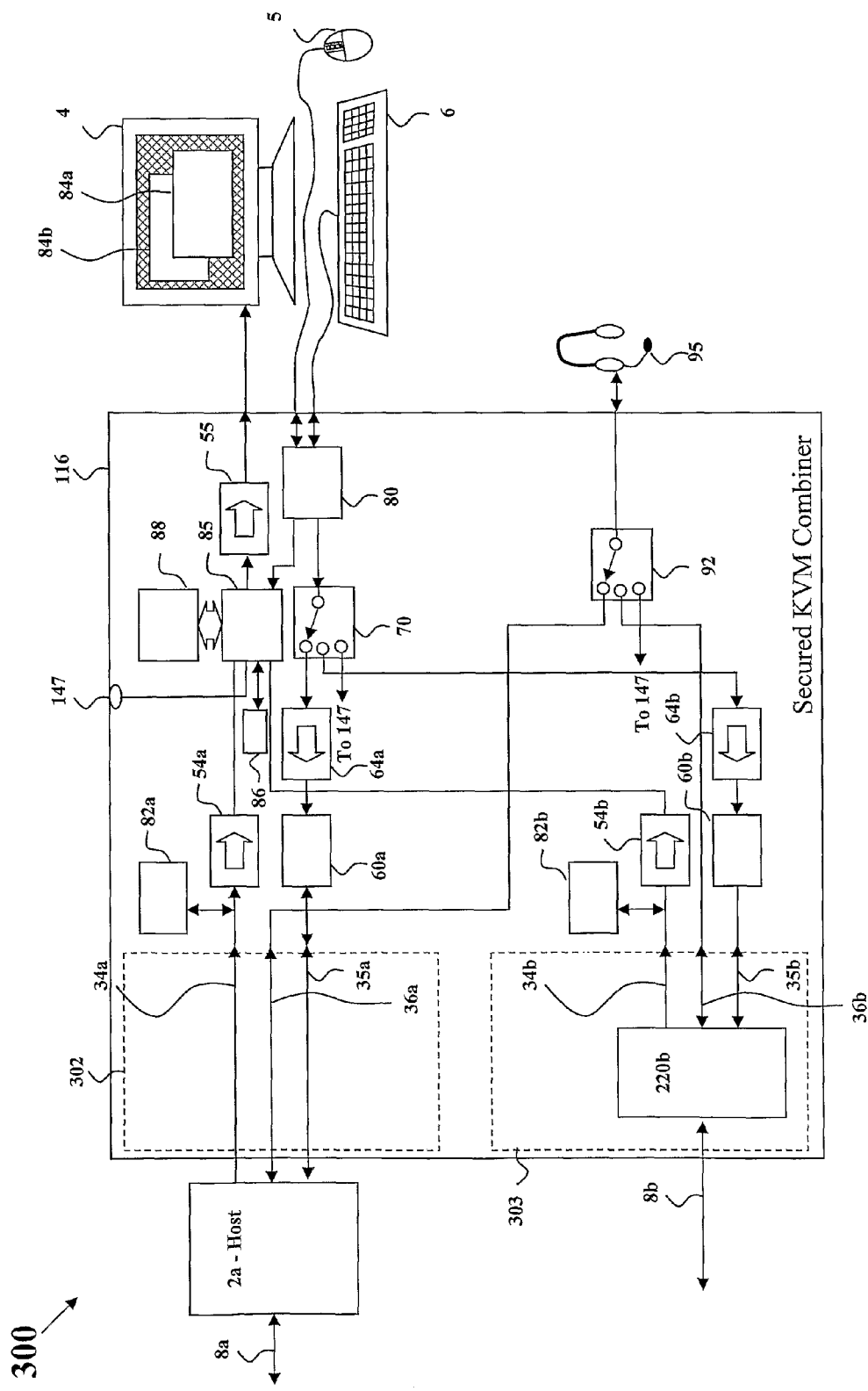
FIG. 6b illustrates yet another typical implementation of a Secured KVM Combiner, similar to the Secured KVM Combiner of the previous figure but with removable modules according to an exemplary embodiment of the present invention.

FIG. 6b illustrates yet another typical implementation of a Secured KVM Combiner 116 similar to the Secured KVM Combiner 115 of the previous FIG. 6a but with removable modules. In this system 300, the Secured KVM combiner 116 is designed as a modular chassis with several identical bays. Bays have electrical interfaces to enable insertion of required modules (302 and 303 in this example). Module 302 is auxiliary interconnection module to interface external host 2a. This module passes through or converts the peripheral interface 35b, video interface 34b and audio interface 36b from attached host 2a. Second module 303 is a thin-client/computer module with internal thin-client/computer 220b attached to external LAN 8b. This modular arrangement enables easy adaptation to the user and the organization with selection of internal or external hosts all interchangeable in a single chassis. Power to the module may be provided by KVM chassis 116 directly or through isolated supply or may be provided by external sources as required.

Figure 7:
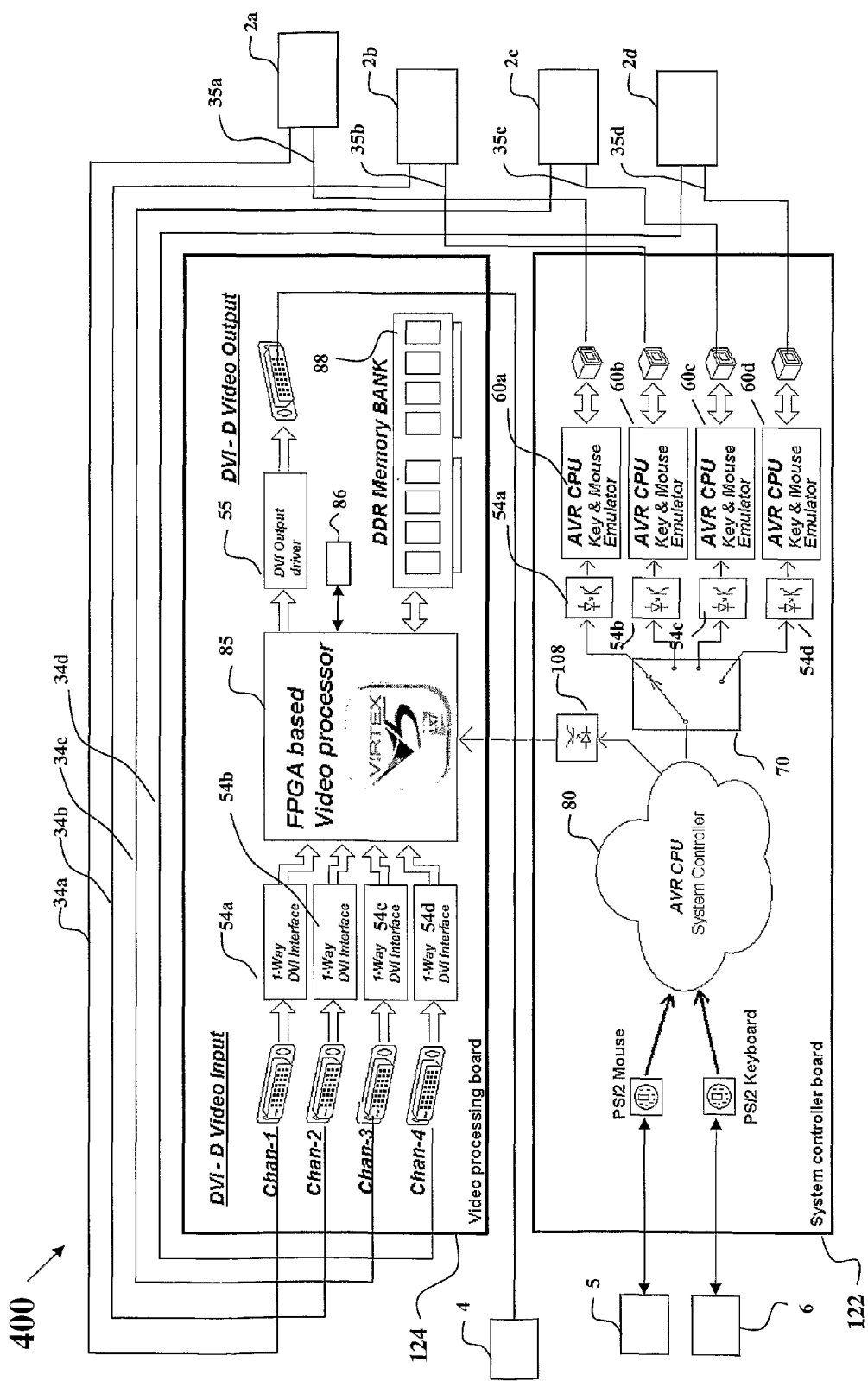
FIG. 7 illustrates a typical implementation of a secured KVM combiner of yet another preferred embodiment of the present invention wherein implementation of the design is separated into two separate boards—video processing board and system controller board.

FIG. 7 illustrates an exemplary implementation of a Secured KVM Combiner 400. In this implementation the design is separated into two separate boards—video processing board 124 and system controller board 122. To enhance product security the only link between system controller board 122 and video processor board 124 is a physical unidirectional enforcing circuitry 108 that connects the host controller 80 and the video processor 80 to deliver video commands and settings such as windows location, size, menu items, frames etc. 1-Way DVI interfaces 54a, 54b, 54c and 54d serves as a receiver (interface) between the differential DVI video in connected to the Host Computers video cards and a parallel (LCD bus) interface connected to the video processor 85. Each DVI Receiver 54a to 54d also serves as a physical unidirectional enforcing circuitry. In case that electrical isolation between video inputs is needed, additional isolators are placed between the DVI receivers and the video processor (not shown here). DVI Receivers 54a to 54d may also powered independently by isolated power supplies to avoid common ground plane. DVI Receivers 54*a* to 54*d* may also have separate electromagnetic shielding to avoid radiation leakage between channels.

In this particular implementation 4 channels are shown, however larger or smaller number of channels may be used.

For simplicity, cascading options are not depicted in this figure

Figure 8A:
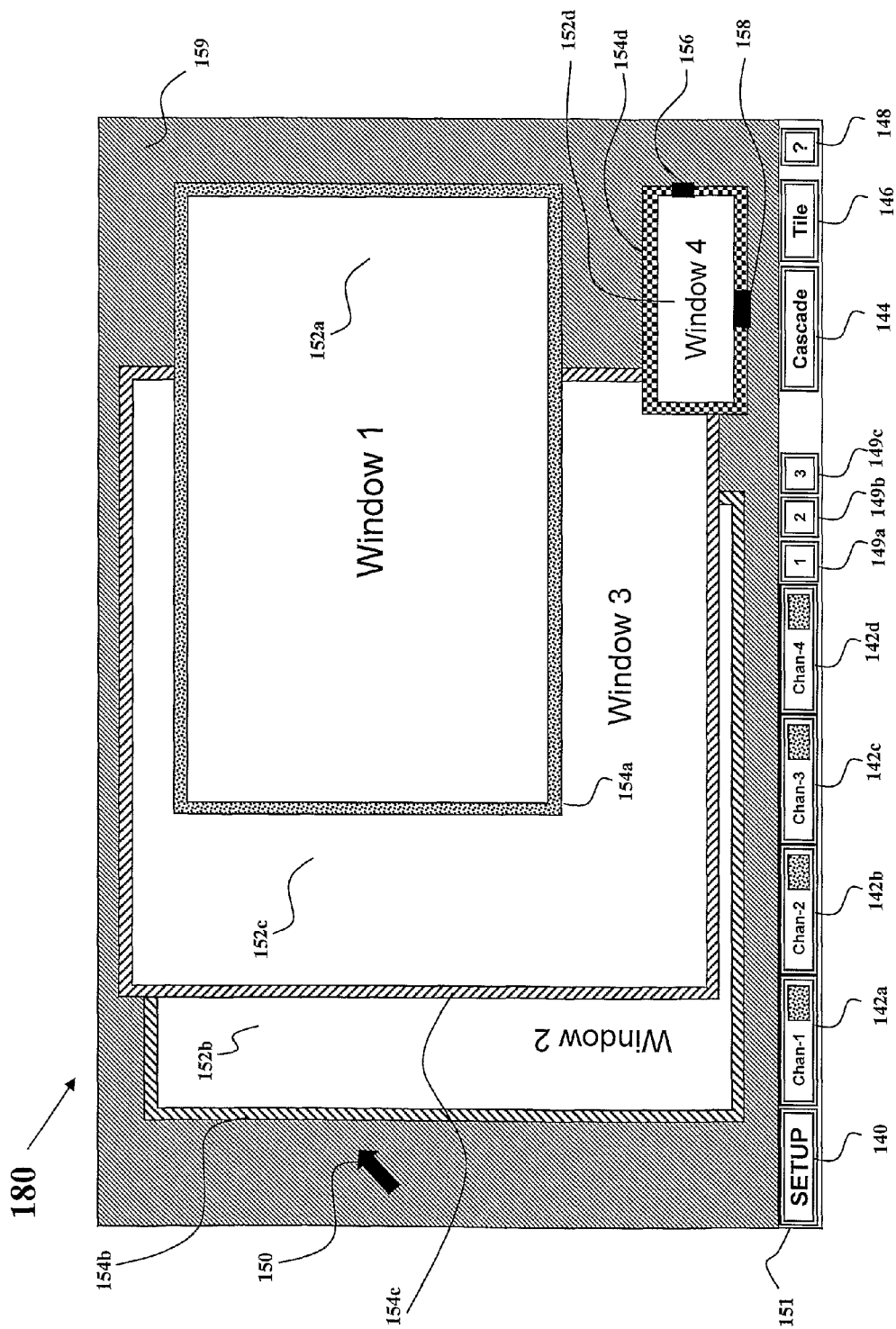
FIG. 8a illustrates a typical implementation of secured KVM combiner user display, in system mode, according to a preferred embodiment of the present invention.

FIG. 8*a* illustrates an exemplary implementation of a Secured KVM Combiner user display 180 in system mode. In the display mode shown, the user may move between different windows and change window size by using a pointing device and special system cursor 150. Task-bar 151 located at the bottom of the visible display presents push buttons for each of the 4 different sources. Channel 1 source is accessed by clicking on channel 1 key 142*a*. Channel 2 source is accessed by clicking on channel 2 key 142*b*, etc. Each channel key is preferably marked with the color selected for that source—for example channel 1 key is marked with colored box identical in color to the frame 154*a* generated by the video processor around window 152*a*. User may optionally cancel (disable) unused channel as will be explained in next FIG. 8*b*. Optionally, user may also use the wheel in wheel mouse device to toggle between the 4 channels and bring each window to the front. The optional setup key 140 in the task-bar 151 enable authorized administrator user to access setup screens. Access to the setup preferably requires authentication means such as front panel key-lock opening, user name and password, smart-card etc.

The background image 159 may be a programmed color or a custom bitmap stored at the Secured KVM Combiner in special non-volatile memory (see FIG. 5 item marked 86).

Preferably, user can use system cursor 150 to drag windows, and change window size by dragging window corner or side frame.

The task-bar may optionally roll down or disappear to save desktop space if mode is changed from system to normal.

User preset keys marked as 149*a*, 149*b* and 149*c* enable user to program specific windows arrangement and store it in one of the keys (this is done foe example by clicking on the preset key and holding for few seconds). Once user settings were stored, clicking on the key will immediately reconfigure the display with the stored setting.

Optional cascade key 144 located in the task-bar 151 change display mode to multiple overlaid windows. The optional tile key 146 arranges all 4 channels side by side to show all channels simultaneously.

Optional help key 148 located in the task-bar 151 may provide help images and text to assist the user in initial operation an in training.

In this example channel 4 window 152*d* reduced to a size smaller than its native resolution. As a result a vertical scroll-bar 156 and horizontal scroll-bar 158 appeared on the window frame 154*d* to enable user control of visible area.

Change from system mode to normal mode and back is preferably done through mouse clicks or other preprogrammed triggers. Once in normal mode, the system cursor disappears and the active host window cursor will be coupled to the user mouse.

Figure 8B:
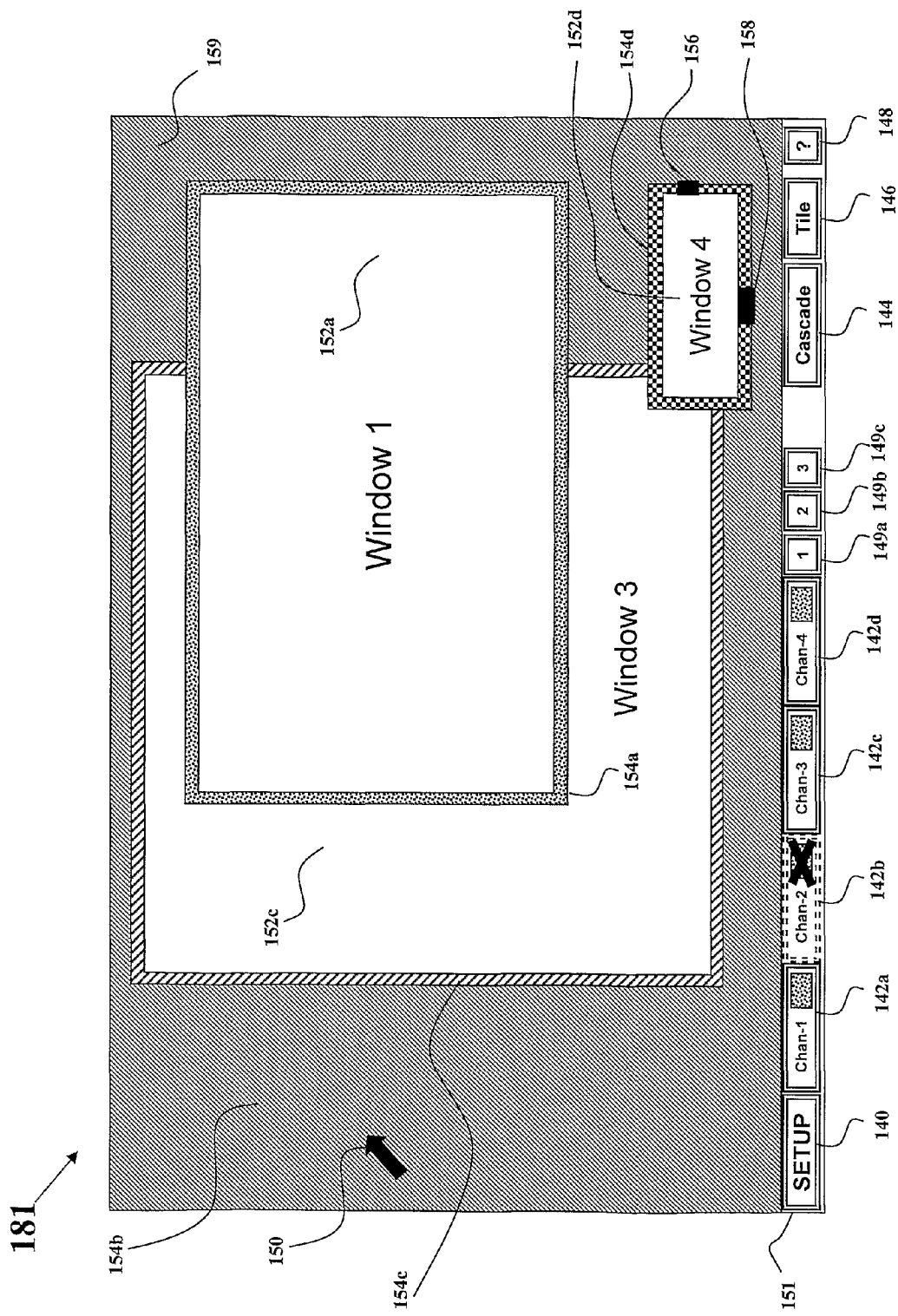
FIG. 8b illustrates another typical implementation of secured KVM combiner user display, in system mode wherein one window was disabled according to another exemplary embodiment of the present invention.

FIG. 8*b* illustrates the same display of FIG. 8 but with channel 2 disabled by the user. Windows 2 marked 152*b* of FIG. 8 is not shown anymore and channel 2 key in the task-bar 142*b* became gray and has a cross on it.

Figure 9:
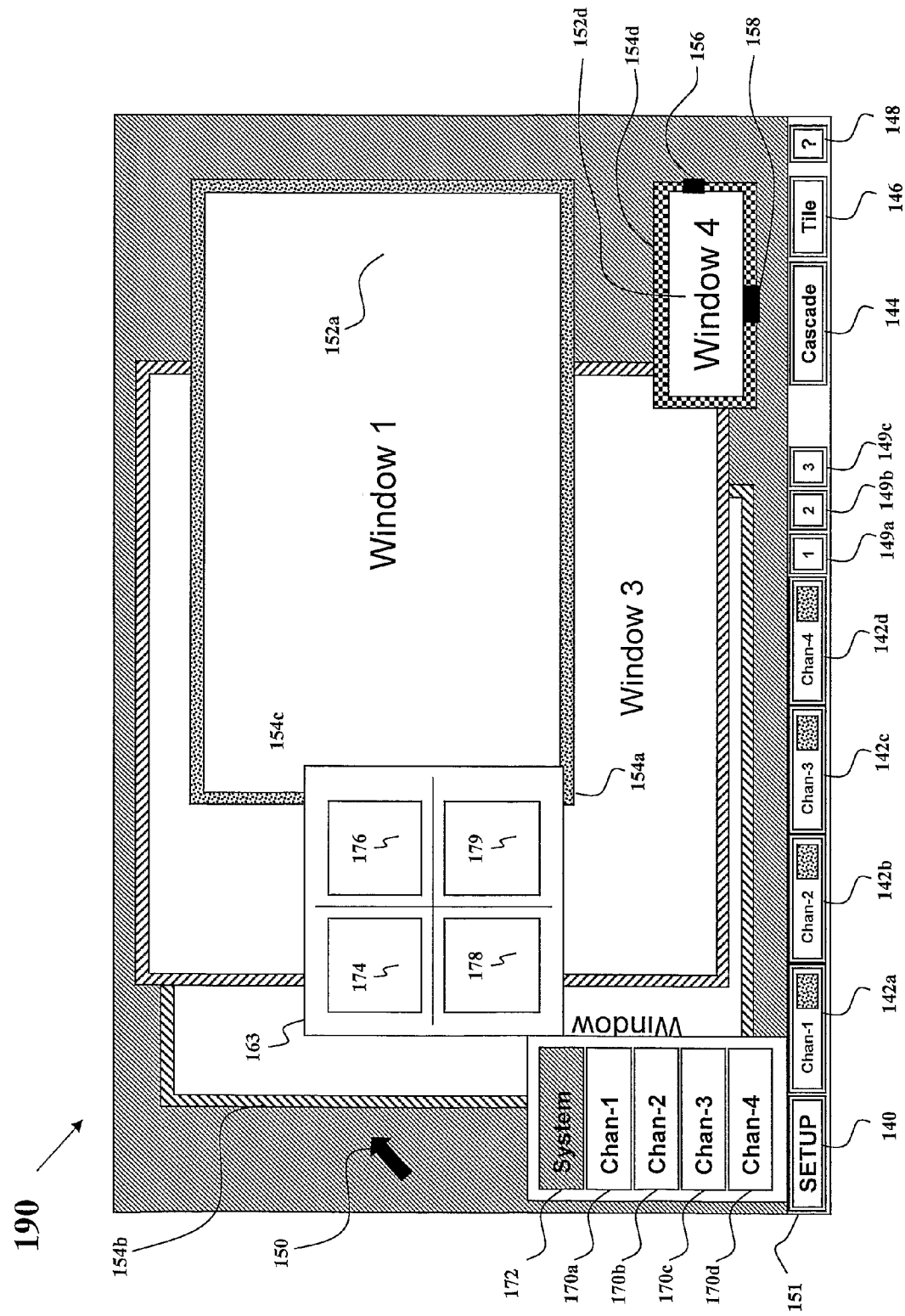
FIG. 9 illustrates a typical implementation of secured KVM combiner user display, in administrator mode, of a preferred embodiment of the present invention.

FIG. 9 illustrates an exemplary implementation of a Secured KVM Combiner user display 190 in administrator mode. This mode is accessible to authorized users through authentication means and by clicking on the SETUP key 140 located in the task-bar 151.

Setup menu will appear on top of setup key 140 to enable user selection of system option 172 or each one of the individual channels 1 to 4 through keys 170*a* to a70*d* respectively. If System key 172 is pressed another menu area 163 appears on top and present system level settings such as: frame width 176, task-bar size 179, system cursor symbol 174 and display output settings 178. This area 163 also shows various hardware parameters and loaded firmware versions.

It should be noted that display output settings may be automatically detected through display DDC interrogation by the host controller 80. This will override administrator selection at setup screen.

When selecting a specific channel key 170*a* to 170*d*, administrator may select channel color and channel input resolution.

Setup may be loaded and saved automatically by external means such as USB flash key or memory card to enable fast device setup.

Figure 10:
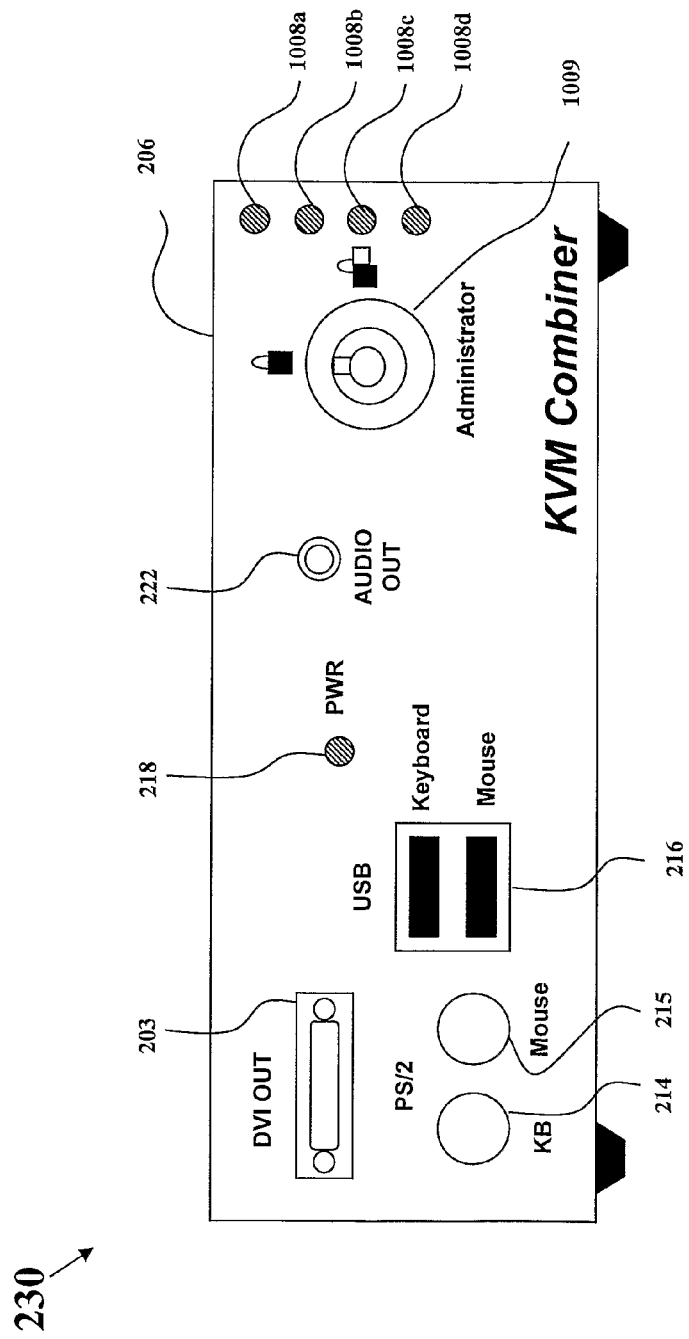
FIG. 10 illustrates typical front panel features of a secured KVM combiner with four external host computer ports of a preferred embodiment of the present invention.

FIG. 10 illustrates an exemplary front panel of a Secured KVM Combiner 230 with four external host computer ports of the present invention. This Secured KVM Combiner is similar to the Secured KVM Combiner shown in FIGS. 4, 5 and 7 above with 4 channels in this specific embodiment of the present invention. It should be noted that more or less channels may be used.

Front panel 206 is preferably having the following features:

DVI OUT Connector 203 to connect a DVI user display. Fiber-optic display interface module may be fitted on the panel to support TEMPEST requirements or remote located display installations. Other display output interfaces, or multiple display output interfaces may optionally be used.

PS/2 keyboard connector 214 to enable connection of user PS/2 keyboard.

PS/2 mouse connector 215 to enable connection of user PS/2 mouse.

Dual USB connectors 216 to enable connection of USB user mouse and keyboard.

Optional Power LED 218 to indicate that the device is powered on.

Audio out jack 222 to enable connection of user headset or speakers.

Optional channel indicators, for example LEDs 1008*a* to 1008*d* may be used for indication the status of the corresponding channel.

Optional administrator lock, for example physical lock 1009 may be used for changing the operation of the apparatus from user mode to administration or set-up mode by authorized personnel. It should be noted that other security measures prevention unauthorized tempering with the system may be employed in hardware or software.

It should be noted that more USB connectors may be used for example for multiple pointing devices. It also noted that only one of PS/2 or USB ports may be used.

It should be noted that some other feature such as Audio input jacks, power input jack and power switch may be located on the front panel.

It should be noted that some of these features and/or other feature may be located at other enclosure sides not shown here. For example the audio input jacks and main power switch may be located on the left side.

Figure 11:
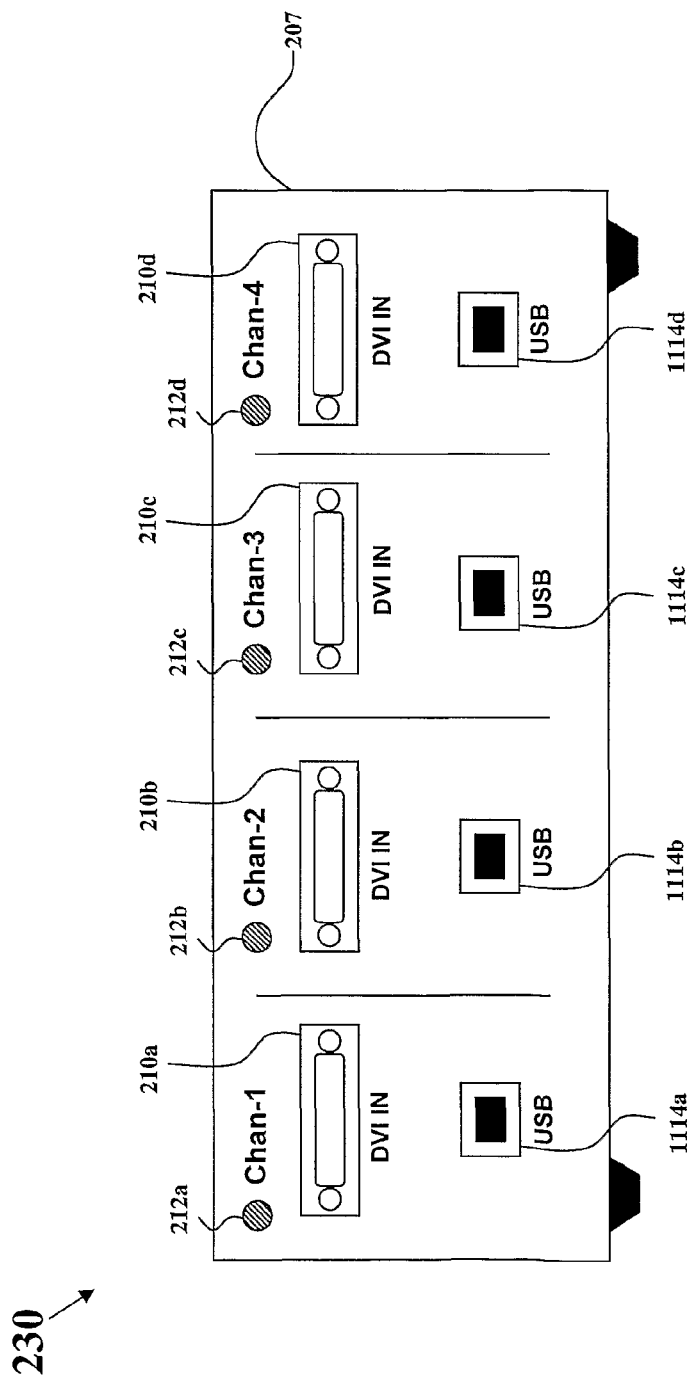
FIG. 11 illustrates typical rear panel features of a secured KVM combiner with four external host computer ports of a preferred embodiment of the present invention.

FIG. 11 illustrates an exemplary rear panel of a Secured KVM Combiner 230 with four external host computer ports according to an exemplary embodiment of the present invention. This Secured KVM Combiner is similar to the Secured KVM shown in FIGS. 4, 5 and 7 above with 4 channels in this specific embodiment of the present invention. Rear panel 207 is preferably having the following features:

USB Type-B connectors 1114a to 1114d to connect to the host computers 2a to 2d USB peripheral ports respectively.

DVI connectors 210a to 210d to connect to the host computers 2a to 2d video output ports respectively.

Optional channel selected LEDs 212a to 212d to indicate the active selected channel.

It should be noted that number of channels may be different.

It should be noted that other I/O interface standards may be used.

Figure 12:
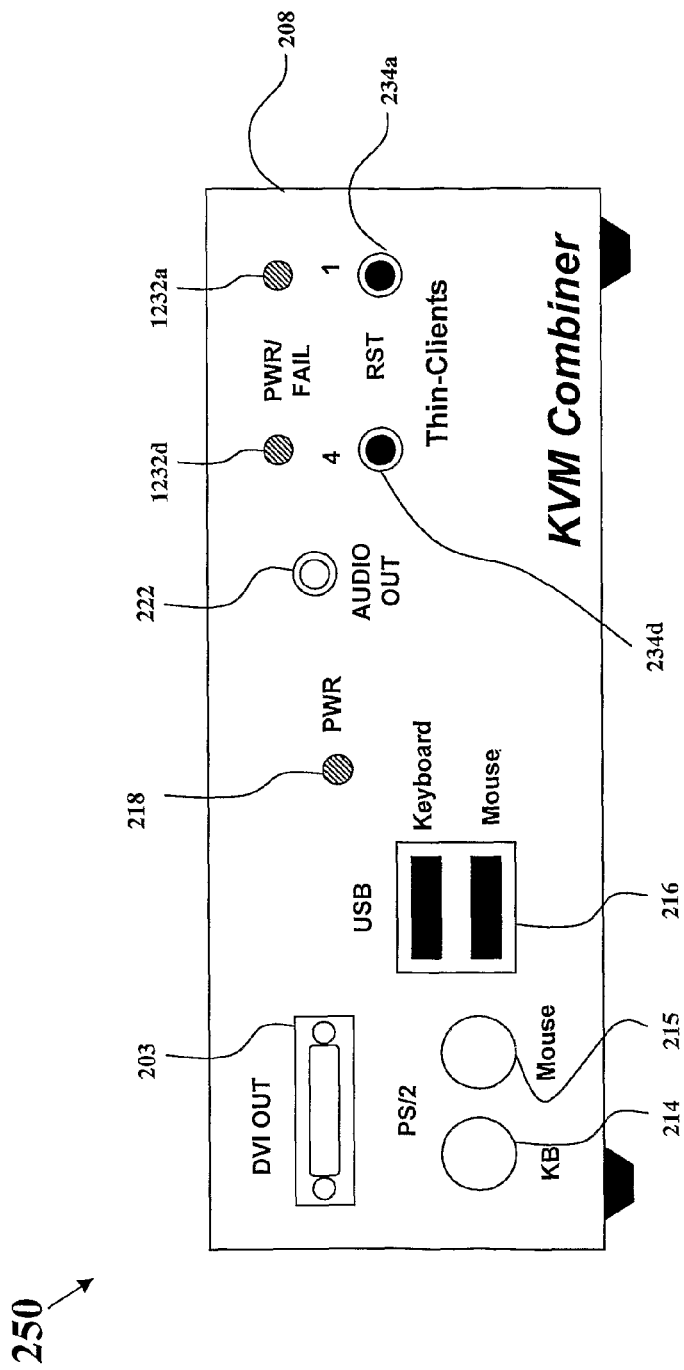
FIG. 12 illustrates typical front panel features of a secured KVM combiner with two external host computer ports and two internal thin-client modules according to yet another preferred embodiment of the present invention.

FIG. 12 illustrates an exemplary front panel of a Secured KVM Combiner 250 with two external host computer ports and two internal thin-client/computer modules of the present invention. This Secured KVM Combiner is similar to the KVM 115 shown in FIG. 6 above but with 4 channels. Front panel 208 is similar to panel 206 in FIG. 10 with the following differences:

Additional thin-client/computer Power LEDs 1232a and 1232d to indicate that the internal thin-client devices are powered on (green color) or failed in boot test (red color).

Additional thin-client/computer RESET switches 234a and 234d to allow the user to reset the internal thin-client devices.

Figure 13:
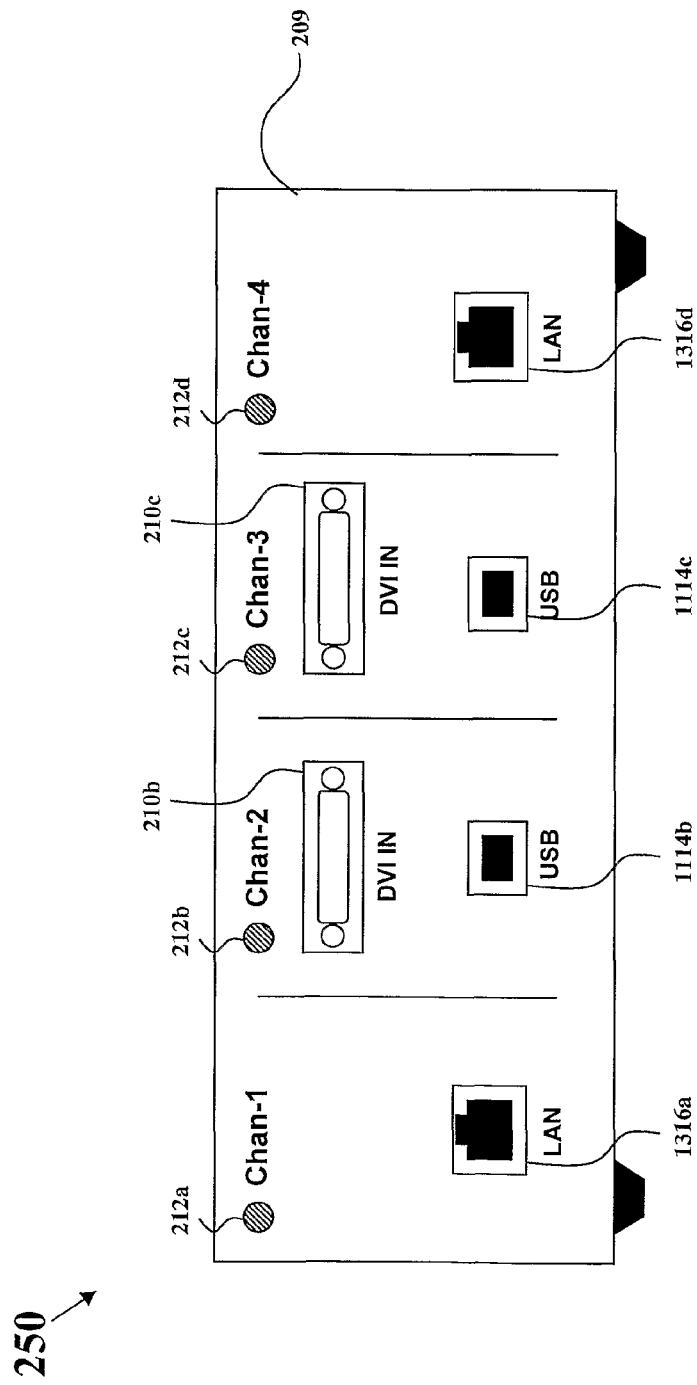
FIG. 13 illustrates typical rear panel features of a secured KVM combiner with two external host computer ports and two internal thin-client modules according to yet another preferred embodiment of the present invention.

FIG. 13 illustrates an exemplary rear panel of a Secured KVM Combiner 250 with two external host computer ports and two internal thin-client modules of the present invention. This Secured KVM Combiner is similar to the KVM 115 shown in FIG. 6 above but with 4 channels. Rear panel 209 is similar to panel 207 in FIG. 11 with the following differences:

USB Type-B connectors 1114a and 1114d replaced by LAN jack 1316a and 1316d respectively to enable LAN connection to internal thin-client modules. LAN connection may be changed to fiber-optic interface such as SFP type connector. LAN jacks 13116a and 1316d may have internal LEDs to indicate LAN Link and Activity status.

DVI connectors 210a and 210d were removed due to the internal thin-client modules at channels 1 and 4.

Figure 14:
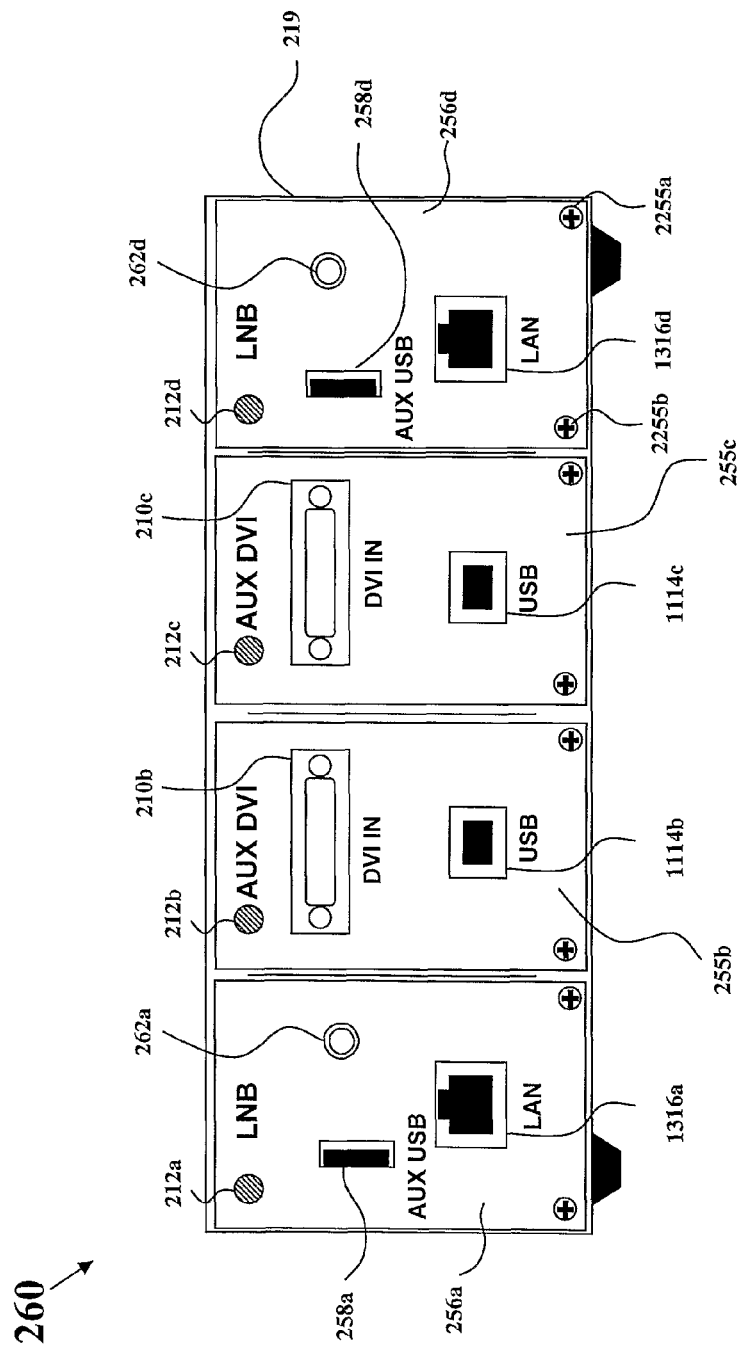
FIG. 14 illustrates a typical rear panel features of a Modular Secured KVM Combiner with two auxiliary host interface modules and two thin-client/computer modules according to yet another preferred embodiment of the present invention.

FIG. 14 illustrates a typical rear panel features of a Modular Secured KVM

Combiner 260 with two auxiliary host interface modules 255b and 255c and two thin-client/computer modules 256a and 256d. This Secured KVM Combiner implementation of the present invention is similar to the KVM 116 shown in FIG. 6b above but with 4 channels. Rear panel shown is made of different modules inserted into KVM chassis 219. Modules are inserted into the chassis 219 and secured by screws or Dzus fasteners 2255a and 2255b. Technician may remove these screws to exchange modules as needed while KVM is at the user desktop.

Modularity of the KVM Combiner offers several advantages compared to non-modular KVMs:

The number and type of modules used can be customized before or after deployment to any required configuration of internal or external hosts.

Cabling can be minimized when internal hosts are used

High security organizations may want to use security policies that dedicate hosts to specific networks after initial exposure to that network. With modular device it is possible to enforce such procedure and keep operational overhead to minimum.

Product maintenance and trouble shooting is simplified compared with integrated hosts.

Thin-client computer modules 256a and 256d panels are fitted with a LAN jacks 1316a and 1316d respectively to attach the LAN, optional auxiliary USB connectors 258a and 258d respectively to attach optional user authentication device or printer and push buttons 262a and 262d respectively to reset the thin-client/computer or to enable restore to factory defaults. Optional microphone jack and other features may be added to enable further user options. LAN jack 1316a or 1316d may be substituted by fiber LAN connection if needed. LEDs 212a and 212d may indicate module selection or status.

Auxiliary host interface modules 255b and 255c panels are fitted with DVI input connectors 210b to enable video input from connected host. USB jack 214b to enable peripheral interface connection to attached host. LED 212b and 212c may indicate module selection or status.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. An isolated KVM device that permits sharing of peripherals between multiple computers in a multi-network computer system comprising:

a USB keyboard input configured to connect to a user keyboard;

a USB pointing device input configured to connect to a user pointing device;

at least a first USB peripheral interface and a second USB peripheral interface, both configured to connect to at least one first host computer and at least one second host computer, respectively, wherein said at least one first host computer and at least one second host computer are capable of being connected to at least two separate networks, respectively;

a host emulator coupled to the user keyboard and user pointing device through said USB keyboard input and said USB pointing device input, respectively, to input keyboard and pointing device data via bidirectional ports and generate single unidirectional serial output signals representing signals input from the user keyboard and the user pointing device;

a first USB peripheral emulator and a second USB peripheral emulator, each of the USB peripheral emulators connected to one of said first and second USB peripheral interfaces, respectively, wherein said first and second USB peripheral emulators receives information in said single unidirectional serial output signals and exchanges bidirectional information with said at least one first and said at least one second host computers;

a peripheral switch connected to said host emulator to selectively direct said information in said unidirectional serial output signals from said USB keyboard input and said USB pointing device input only to one of said first USB peripheral emulator or said second USB peripheral emulator at a time;

at least a first physical unidirectional enforcing circuitry and a second physical unidirectional enforcing circuitry, each connected between said peripheral switch and said first and second USB peripheral emulators, respectively, enforcing unidirectional data flow only from said peripheral switch to the USB peripheral emulators; and wherein said first and second USB peripheral emulators are electrically isolated from one another and all other circuitry in said KVM device other than said first physical unidirectional enforcing circuitry, said second physical unidirectional enforcing circuitry and said host computers.

2. The isolated KVM device of claim 1, further comprising:

at least one first video input interface and at least one second video input interface configured to connect to video outputs of at least one first host computer and at least one second host computer, respectively;

at least one video output port configured to connect to a user display device;

a video processing function capable of receiving video signal from at least one first video input port and at least one second video input port and capable of transmitting video signal to said at least one video output port; and at least one first video physical unidirectional isolator and at least one second video physical unidirectional isolators connected between said video processing function and one of said at least one first video input interface and said at least one second video input interface, respectively, enforcing data flow only from the first and second video input interfaces, respectively, to said video processing function.

3. The isolated KVM combiner of claim 2, wherein said video processing function is capable of combining video signals from a plurality of video input interfaces to a composite video signal to be displayed on the user display device.

4. The isolated KVM combiner of claim 3, wherein said composite video signal to be displayed on the user display device comprises at least one first window and at least one second window, wherein video content of said at least one first window is derived of video signal from the first video input interface, and video content of said at least one second window is derived of video signal from the second video input interfaces.

5. The isolated KVM combiner of claim 4, wherein only one of said at least one first window and said at least one second window is active, and the video content of the active window is derived of video signal from video input interface associated with a selected peripheral interface.

6. The isolated KVM combiner of claim 3, wherein said composite video signal is configured to be displayed on the user display device.

7. The isolated KVM combiner of claim 3, wherein video processing function is capable of generating colored frames around host video windows to help users identifying window source.

8. The isolated KVM combiner of claim 2, wherein said video processing function is responsive to commands received from one of said keyboard input and said pointing device input.

9. The isolated KVM device of claim 1, wherein the host emulator receives a host selection input from at least one of said keyboard and said pointing device, and commands said peripheral switch to direct said information to only one of said first and second host computers at a time in response to said host selection input.

10. An isolated KVM device for multi-network computer system comprising:

a human USB interface device input configured to connect to a keyboard and a mouse;

a host emulator configured to exchange bidirectional information with said keyboard and said mouse through said human USB interface device input, wherein said host emulator is capable of serving as an interface between bidirectional standard peripheral protocol and unidirectional internal protocol data stream;

a plurality of USB peripheral interfaces, each connected to each one of a plurality of host computers;

a plurality of USB peripheral emulators, each connected to one of said USB peripheral interfaces, wherein said plurality of USB peripheral emulators receive information in said unidirectional internal protocol data stream and exchange bidirectional information with said plurality of host computers;

a peripheral switch connected between said host emulator and said plurality of USB peripheral emulators, to selectively direct said unidirectional internal protocol data stream from said host emulator only to a selected one of said plurality of USB peripheral interfaces at a time;

a plurality of physical unidirectional enforcing circuitries, each is connected between said peripheral switch and one of said plurality of USB peripheral emulators, wherein said plurality of unidirectional enforcing circuitries is capable of enforcing data flow only from said peripheral switch to said plurality of USB peripheral emulators, wherein said plurality of USB peripheral emulators are electrically isolated from one another and all other circuitry in said KVM device other than said plurality of physical unidirectional enforcing circuitries and said host computers.

11. The isolated KVM of claim 10, wherein said host emulator is capable of controlling said peripheral switch in response to commands received from at least one of said keyboard and said mouse.

12. The isolated KVM device of claim 11, wherein said host emulator is a single host controller capable of receiving signals from said keyboard and said mouse through said human USB interface device input, and wherein said controller is capable of serving as an interface between bidirectional standard peripheral protocol and single unidirectional serial internal protocol data stream, and wherein each and only one of said USB peripheral interfaces is configured to connect to each one of said plurality of host computers wherein each of said plurality of host computers is connected to a separate network.

13. The isolated KVM device of claim 10, wherein the number of said physical unidirectional enforcing circuitries connected between said peripheral switch and said plurality of USB peripheral emulators is less than four times the number of said USB peripheral interfaces.

14. The isolated KVM device of claim 13, wherein the number of said physical unidirectional enforcing circuitries connected between said peripheral switch and said plurality of USB peripheral emulators is equal to the number of said USB peripheral interfaces.

15. The isolated KVM device of claim 14, wherein the number of said physical unidirectional enforcing circuitries connected between said peripheral switch and said plurality of USB peripheral emulators is equal to the number of said USB peripheral interfaces.

16. An isolated KVM device for multi-network computer system comprising:
   a USB keyboard input configured to connect to a user keyboard;
   a USB pointing device input configured to connect to a user pointing device;
   a first USB peripheral interface and a second USB peripheral interface connected to a first host computer and a second host computer, respectively, wherein the first and second host computers are capable of being connected to at least two separate networks, respectively;
   a host emulator coupled to the keyboard and the pointing device through said USB keyboard input and said USB point device input, respectively, to input keyboard and pointing device data via bidirectional USB ports and generate single unidirectional serial output signals representing keyboard input data and pointing device input data;
   a peripheral switch selectively directing said single unidirectional serial output signals representing said keyboard input data and said pointing device input data received from said host emulator only to a selected one of said first USB peripheral interface and said USB second peripheral interface at a time;
   at least one first physical unidirectional enforcing circuitry and at least one second physical unidirectional enforcing circuitry, each connected between said peripheral switch and one of the USB peripheral interfaces, respectively, wherein said at least one first physical unidirectional enforcing circuitry and said at least one second physical unidirectional enforcing circuitry is capable of enforcing data flow only from said peripheral switch to the USB peripheral interfaces;
   at least one bay into which one of the host computers can be inserted,
   wherein said first and second USB peripheral interfaces are electrically isolated from one another and all other circuitry in said KVM device other than said first physical unidirectional enforcing circuitry and said second physical unidirectional enforcing circuitry and said host computers.

17. The isolated KVM device of claim 16, wherein at least one of the host computers is a computer module integrated within the isolated KVM device.

18. The isolated KVM device of claim 16, wherein at least one of the host computers is a thin-client device.

19. The isolated KVM device of claim 16, wherein at least one of the host computers is substituted by an external video source interface.

20. The isolated KVM device of claim 16, further comprising:
   a plurality of audio interfaces, each is connected to one of the host computers, respectively;
   an audio multiplexer connected to said plurality of audio interfaces and to at least one audio peripheral selected from a group consisting of: microphone, headset, and a speaker.

21. The isolated KVM device of claim 16, further comprising a cascading port to enable the isolated KVM device to be cascaded to another isolated KVM device.

* * * * *